Oct. 10, 1944.  R. L. REDMOND  2,360,276
SEAL FOR HATCH COVERS
Filed Jan. 12, 1942  2 Sheets-Sheet 1
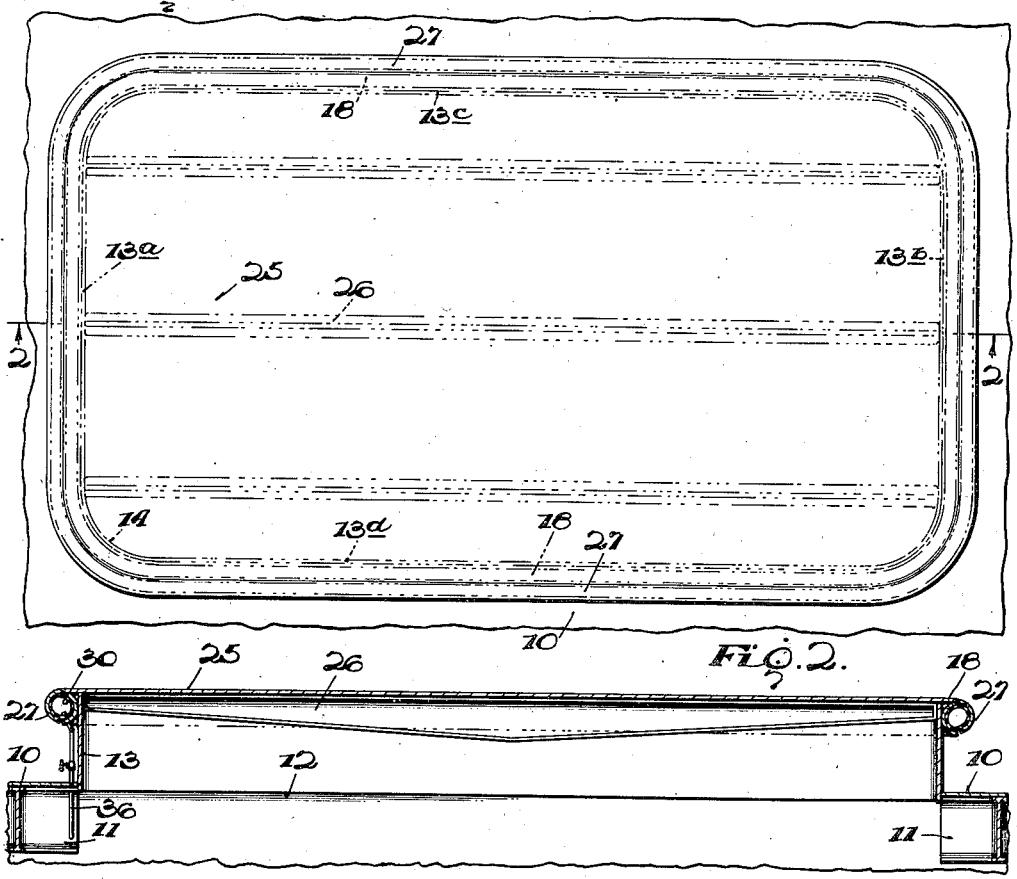
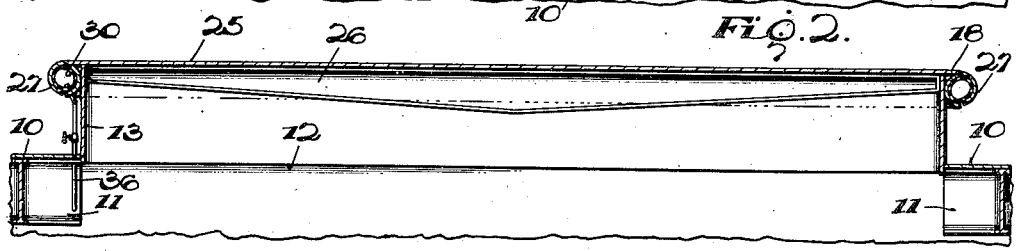
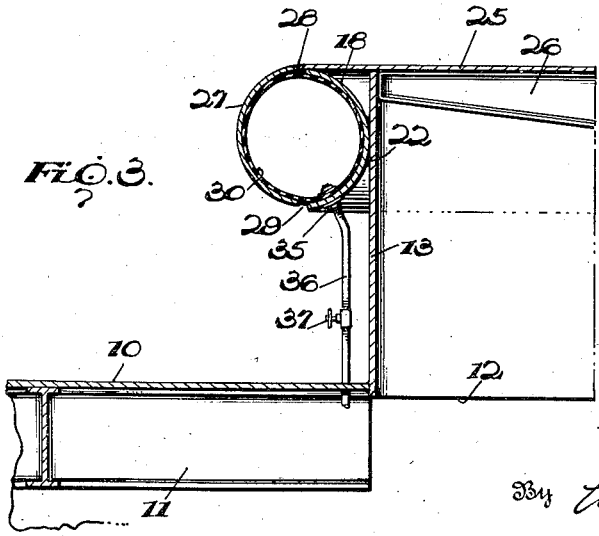
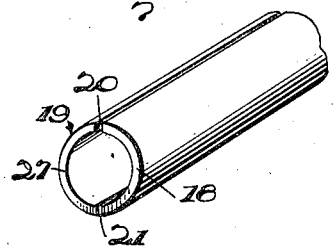
Inventor
Roland L. Redmond
By
Attorney

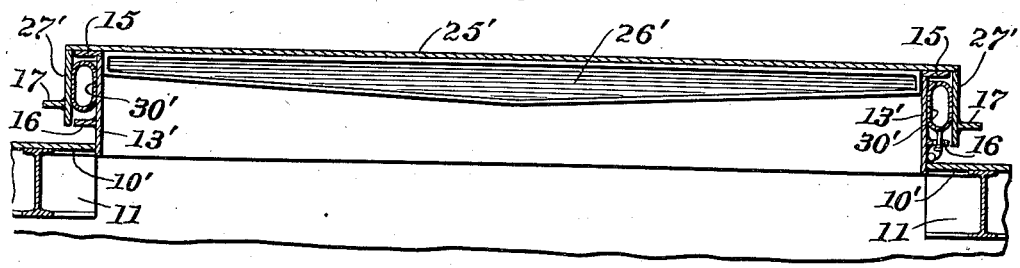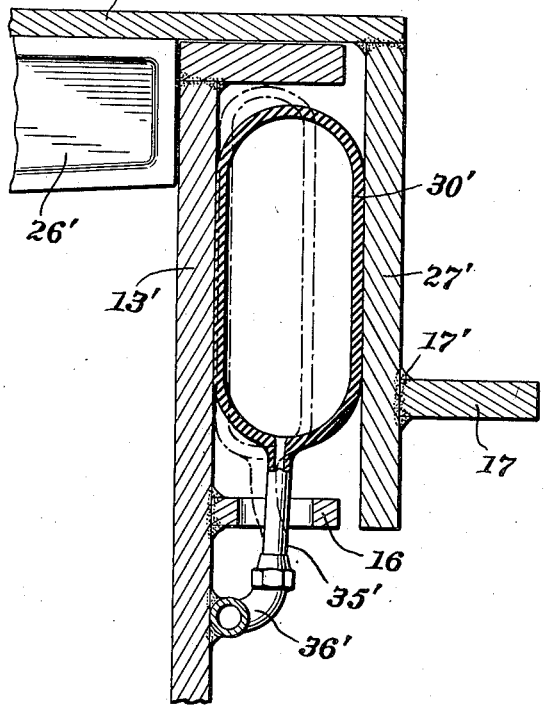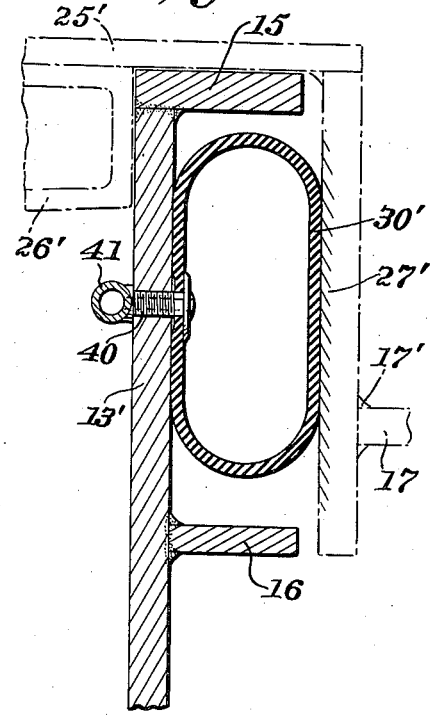

Patented Oct. 10, 1944

2,360,276

UNITED STATES PATENT OFFICE 2,360,276

SEAL FOR HATCH COVERS

Roland L. Redmond, New York, N. Y.

Application January 12, 1942, Serial No. 426,529

2 Claims. (Cl. 114—201)

The present application is a continuation-in-part of and a substitute for my copending application Serial No. 412,651, filed September 27, 1941, which became abandoned January 21, 1942.

The present invention relates to ships and more particularly to hatch openings, hatch covers and means for sealing and securing the hatch covers in place over the hatch openings.

A primary object of the invention is to provide a substantially air and water-tight seal for hatch covers which is simple in construction, and which may be made inexpensively and easily.

A further object of the invention is to provide a substantially air and water-tight seal for hatch covers, without the necessity of using accurately machined surfaces and gaskets or complicated securing devices to hold the hatch cover in place. To this end, the invention contemplates employing, as a sealing means, an inflatable member positioned to be expanded by compressed air or the like to make sealing contact with elements associated respectively with the walls of the hatch opening and the hatch cover. The specific shapes of the surfaces of the elements with which the inflatable member makes contact may be varied greatly, depending upon the usage to which the boat is to be subjected.

A further object of the invention is to provide novel and greatly simplified means for holding a hatch cover in position closing the hatch opening, thereby eliminating entirely the complicated hold-down devices conventionally employed to batten-down the hatches.

A further important object of the invention is to provide a construction for maintaining a hatch cover in place during all normal conditions of use, and even under abnormal conditions resulting from high seas and bad weather, but which is automatically releasable upon the occurrence of extremely unusual, emergency conditions, such as an explosion in the hold, resulting from shell fire, a torpedo or the like. The purpose of this phase of the invention is to permit the hatch cover to be blown open, thereby to relieve the pressure resulting from an explosion, to prevent collapse of the bulkheads or damage to other walls enclosing the area of the explosion. Thus, damage to the ship is confined to the immediate vicinity of the explosion, and other portions of the ship are maintained water-tight.

Other and further objects and advantages of the invention will be apparent to those skilled in the art, from a consideration of the following description of two specific embodiments of the invention, shown by way of example, in the accompanying drawings, in which:

Figure 1 is a plan view of a portion of a ship's deck, showing an improved hatch opening, hatch cover and seal.

Figure 2 is a transverse section on line 2—2 of Figure 1.

Figure 3 is an enlarged sectional detail.

Figure 4 is a diagrammatic detail showing one method of constructing certain of the elements used in the invention.

Figure 5 is a view similar to Figure 2, showing a modified form of the invention.

Figure 6 is an enlarged fragmentary sectional view of the same, and

Figure 7 shows a modified form of air connection for the inflatable body.

The weather deck of a ship is indicated at 10 and it will be understood that the same is constructed in any preferred conventional manner and may be supported by frame members 11 or the like. The hatch opening 12 is defined by upwardly projecting marginal walls or coaming 13, extending above the plane of the deck. Preferably, the walls include substantially straight ends 13a, 13b and similar straight sides 13c, 13d, the side and end walls being joined by curved corner sections 14, so that the hatch opening is substantially rectangular in plan, except that it has rounded corners. The walls 13 are preferably constructed of steel plate, welded by continuous seam welds to the deck and, if desired, to the supporting frame members 11.

Adjacent the upper end of the walls 13, there is positioned a substantially continuous, outwardly facing channel member 18, which may be formed by cutting a pipe 19 diametrically, as indicated at 20, 21 in Figure 4. The section 18 is bent by suitable means to follow the marginal contour of the hatch opening and is welded as at 22 to the walls 13, thereby providing a continuous, horizontally disposed, outwardly facing channel or groove around the hatch opening.

The hatch cover may comprise steel plates 25, butt-welded to each other and to suitable reinforcing members 26, which extend substantially from end to end of the hatch opening. The margins of the hatch cover extend outwardly beyond the walls 13 of the hatch opening and, in accordance with one form of the invention, carry downwardly and inwardly curved portions 27 providing a marginally continuous, horizontally arranged, inwardly facing channel or groove opposite the channel provided by the member 18. Preferably, the channel forming member 27 is formed by suitably bending the other half section of the diametrically split pipe 19 and is secured to the hatch cover by a continuous butt-weld 28.

It will be noted that the margins of the channel sections are slightly offset and are spaced apart as at 29 to facilitate installation and removal of the hatch cover upon the walls defining the hatch opening.

Disposed within the space defined by the mutually facing channel members 18 and 27, there is an inflatable member 30, preferably formed of a continuous rubber tube or the like, which may be generally similar to a heavy automobile tire inner tube, though, of course, greatly elongated in its annular dimensions. The invention is not limited to the use of a single, continuous inflatable tube, as the seal may be made up in a plurality of sections.

The inner channel member 18 is provided with a fitting 35 for inflating the tube 30, and, for this purpose, a conventional automobile inner tube valve stem assembly is suitable, although the valve therein is unnecessary, as the stem is preferably connected by a pipe 36 to a suitable source of compressed air, and a conventional three-way valve 37 is interposed in the line, to permit the tube to be inflated or deflated, as desired. In fact, the valve 37 may have a port communicating with a source of suction, whereby the tube 30 may be completely collapsed into the channel 18 when it is desired to install or remove the hatch cover.

In the operation of this form of the invention, after the hold has been loaded, the hatch cover is dropped down upon the hatch opening, while the tube 30 is deflated. When in position, the channel members 27 are disposed opposite to the members 18 associated with the walls of the hatch opening. The valve 37 is then manipulated to inflate the tube 30, thereby causing the same to expand forcefully against the walls of the mutually facing channels 18 and 27, to seal the space therebetween. When the tube has been inflated to the proper pressure, the valve 37 is closed, to prevent leakage of the air under pressure in the tube.

When in this position, it will be apparent that normal lifting forces will not be able to compress the inflated tube sufficiently to permit removal of the cover from the hatch opening. For instance, water washing over the deck during high seas will have only a small surface, constituted by the inwardly turned, lower half of the channel 27, to work upon in exerting lifting force. The inflated tube 30 will be sufficient to effectively resist such forces and the hatch cover will be maintained in position under all normal conditions.

In the event of an explosion within the hold of the ship, however, such as might result from an explosion of a shell or a torpedo, the pressure will be exerted over the entire area of the inner face of the hatch cover, with the result that the tube 30 will either be collapsed or disrupted, to permit the hatch cover to be blown off, thereby relieving the pressure and preventing damage to other portions of the ship, such as the side walls and bulkheads thereof.

When the ship reaches its destination, undamaged, the valve 37 is manipulated to permit the air in the tube 30 to be discharged to atmosphere, thereby relieving the pressure in the tube and breaking the seal between the hatch cover and the walls of the hatch opening. When the tube is in this condition, the hatch cover may be readily lifted and removed, to give access to the hold.

In the second form of the invention, shown in Figures 5–7, the hatch is constructed in substantially the same manner as in the first form and is defined by coaming walls 13' projecting upwardly from the deck 10' and welded thereto, as previously described. The walls 13' at their upper edges carry a laterally projecting flange 15, welded thereto and constituting a stiffener for the coaming and a projecting flange for the inflatable body, hereinafter described. A lower stiffening flange 16, similarly welded to the coaming 13', performs a similar function at the underside of the inflatable body.

The hatch cover 25' has its margins seated upon the upper surface of the flange 15 and projects outwardly a slight distance therebeyond. It may be strengthened by reinforcing members 26', welded thereto, as previously described. A depending flange 27' is secured, preferably by welding, to the margins of the cover 25' and is suitably stiffened by a laterally projecting flange 17, welded thereto, as indicated at 17'.

An inflatable tube 30', oblong in cross-section and vertically elongated, particularly when deflated, is disposed within the space between the coaming 13' and the depending flange 27' of the hatch cover, the tube being restrained against substantial displacement by the laterally projecting upper and lower flanges 15, 16.

The tube 30' may be connected by a flexible hose or coupling 35' to an elbow 36', leading to a source of air under pressure, a valve (not shown) being interposed as described above. The connection and the piping may be disposed exteriorly of the coaming 13', as shown in Figures 5 and 6, or, if desired, the tube may be connected by a nipple 40 to an air conduit 41 disposed interiorly of the hatch coaming, as shown in Figure 7.

Connections of the type shown in Figures 2, 3 and 6 are desirable in many cases, since they leave the hatch opening entirely unobstructed and are not likely to become damaged by the cargo, during loading and unloading operations. The construction shown in Figure 7, however, has the inherent advantage that the air line is not likely to be damaged or ruptured by objects moving over the deck surface, or by bomb splinters or fragments. Either construction may be used, according to the preference of the ship designer.

It has been found that the frictional engagement between the walls of the tube 30 and the opposed walls of the coaming 13' and the depending flange 27' of the hatch cover, when the tube is inflated, is sufficiently firm to maintain the hatch cover 25' in place under all normal conditions of use, even in high seas, when water is washing over the deck. In the case of an explosion within the hold, however, as explained above, the cover is readily blown off, to relieve the excessive pressures created thereby.

The construction shown in Figures 5–7 is preferred in some cases, because of its simplicity and cheapness of manufacture. Moreover, a tube having substantially the deflated cross-section shown in dotted lines in Figure 6 may be held in position by being stretched fairly tightly about the coaming 13'. In this position, it is protected by the flanges 15 and 16, while the ship is being loaded and when the hatch cover 25 is being put in place. It is usually unnecessary to inflate the tube more than is indicated in the full line position of Figures 6 and 7, but it will be apparent that the upper and lower surfaces of the tube may be inflated against the flanges 15, 16, if desired.

The hatch cover and sealing means in accordance with the present invention provides a construction that is water-tight, air-tight and gas-tight. Moreover, it is substantially impervious to and will not be readily damaged by flame on the inside of the hold, but, in case of an explosion in the hold, is readily blown off. As pointed out above, it cannot be dislodged by the sea washing over the deck.

The connection provided by the cooperating surfaces of the coaming and the hatch cover and the inflatable tube is extremely simple and involves no dogs, lugs, wedges or the like, which have always been necessary with conventional hatch covers. Moreover, the canvas covering conventionally employed is entirely eliminated. It will be obvious that the cover can be hinged along one side, if desired, and swung to and from closed position, since the hatch cover is of inherently light weight construction.

The force required to dislodge the hatch cover when secured in place varies directly with the air pressure in the tube, as will be apparent to those skilled in the art. The cover may be manually removed with ease by simply deflating the tube and lifting the cover from the hatch.

Although the invention has been described with considerable particularity in the foregoing specification, by reference to the embodiments illustrated in the accompanying drawings, it must be understood that it is not limited to the details of construction shown and described, but covers all modifications coming within the scope of the appended claims and their equivalents.

I claim:

1. In a ship, a hatch opening defined by substantially continuous marginal walls projecting upwardly from the ship's deck, a horizontally disposed, outwardly facing channel member having a substantially semi-circular cross-section secured to said walls and extending continuously around the hatch opening, a hatch cover extending outwardly beyond said walls and having a horizontally disposed, inwardly facing, substantially continuous channel member secured to its margins and positioned opposite to the first-mentioned channel member and facing the same, an inflatable, expansible member disposed within the space defined by the channel members, and means for inflating said member to cause the same to expand and make contact with said channel members.

2. In a ship, a hatch opening defined by substantially continuous marginal walls projecting upwardly from the ship's deck, a horizontally disposed, substantially continuous half pipe section welded to said walls and providing a continuous, outwardly facing channel therearound, a hatch cover extending outwardly beyond said walls, a horizontally disposed substantially continuous half pipe section welded to the margins of said hatch cover and providing a continuous, inwardly facing channel opposite to the first-mentioned channel, and an inflatable member disposed in the space defined by said channels and adapted, when inflated, to make sealing contact with the surfaces thereof.

ROLAND L. REDMOND.